United States Patent [19]
Firman
[11] 3,904,966
[45] Sept. 9, 1975

[54] SYNCHRONIZED TURN-OFF OF VLF ANTENNAE

[75] Inventor: Carl M. Firman, San Diego, Calif.
[73] Assignee: The United States of America as represented by the Secretary of the Navy, Washington, D.C.

[22] Filed: Jan. 31, 1972
[21] Appl. No.: 222,194

[52] U.S. Cl. ............... 325/163; 178/66 A; 325/172
[51] Int. Cl.[2] ............... H04B 1/04
[58] Field of Search ............ 325/159, 163, 172–178, 325/30; 178/66 A, 66 R; 307/88 R

[56] References Cited

UNITED STATES PATENTS

| | | | |
|---|---|---|---|
| 2,712,061 | 6/1955 | McClellan | 325/163 |
| 2,989,624 | 6/1961 | Jacob | 325/174 |

*Primary Examiner*—Robert L. Griffin
*Assistant Examiner*—Jin F. Ng
*Attorney, Agent, or Firm*—R. S. Sciascia; G. J. Rubens; J. W. McLaren

[57] ABSTRACT

A sample of an RF signal being transmitted is obtained and the zero current crossover point of that sample signal is detected. A switch is operative upon actuation to change the resonance of the transmitting antenna and an enabling means is employed to control such actuation, the enabling means being responsive to the concurrence of a frequency shift command signal and the output signal of the zero current crossover detector. A means is provided for selectively varying the actuation of the switch to a point in time slightly before the zero current crossover point of the actual signal being transmitted for minimizing the transient signal load on the switch means when the frequency being transmitted is switched off.

7 Claims, 2 Drawing Figures

SYNCHRONIZED TURN-OFF OF VLF ANTENNAE

BACKGROUND OF THE INVENTION

The subject matter of the present invention is generally related to problems typically encountered in the use of silicon controlled rectifiers as switching devices and more particularly where such switching devices are employed with reactance keyed antenna tuning apparatus. Such problems are typified in U.S. Pat. No. 3,553,493, issued to DeWitt H. Miller on Jan. 5, 1971 and U.S. Pat. No. 3,319,168 issued to W. R. Olson on May 9, 1967 which deal with problems of firing SCR devices and arrays and U.S. Pat. No. 3,549,908 issued to Robert C. Houlne on Dec. 22, 1970 which deals with the problem of turning off SCR switches where they are carrying a DC load.

The present invention relates to a particular problem which arises in the rapid tuning of resonant circuits and more particularly where a system for selectively tuning an antenna is employed in a very low frequency (VLF) radio transmitter which may be part of a military communication system, for example. Very low frequencies in the radio spectrum are desirable for use in certain types of communications since the transmitted signal is not subject to significant fading nor to significantly objectionable daily or seasonal variations.

In a reactance keyed VLF communication system two different frequencies are customarily transmitted and it is necessary that the antenna resonant frequency be maintained substantially the samae as the instantaneous transmitter frequencies. This operative condition may be achieved by changing the inductance of the antenna circuit through selectively shunting a portion of the resonant antenna circuit.

This also can be achieved by arranging that an inductance which is coupled to the antenna circuit be controllably shunted, thereby tuning the antenna circuit to the instantaneous frequency of the transmitter circuit. Such shunting may be accomplished by employing SCRs connected across the coupled inductance and causing conduction through the SCRs thereby effectively shorting out a portion of the tuning inductance at appropriate periods in time and in response to the particular frequencies being developed by the transmitter portion of the system.

When the SCRs are conductively connected across the controlling reactive element, such as an inductor, the antenna will be resonantly tuned to one frequency, whereas when conduction through the same SCRs across the controlling reactance is cut off, the antenna will be resonantly tuned to another frequency. These frequencies, can, of course, be calculated and predetermined to ascertain, quite accurately, the electrical properties of the inductors etc. required to achieve the desired results.

However, since such VLF communication systems frequently operate at extremely high power levels, an ancillary problem arises which involves the current carrying capabilities of the SCRs used to affect the reactance keying technique. This problem involves not only reactive current but also the rate of change of current, di/dt. It has been found that if certain amplitudes of reactive current or of the rate of change of current are exceeded in the operation of the SCRs, they will be damaged or rendered inoperative thereby causing a malfunction of the reactance keying operation.

The previously referenced Olson patent is concerned with selectively controlling SCRs which are employed as switches to short circuit selected portions of a loading coil which is determinative of the instantaneous resonant frequency of the antenna. In the converse operation i.e., that of causing the SCRs to be non-conductive, the antenna may be made to be reasonant at other frequencies as desired. However, it has been found that, upon the cessation of conduction by the SCRs, rather severe transient currents can be developed. These transient currents may be so severe as to prevent the cut-off of conduction by the SCRs and can result in severe damage to the associated circuitry as well as causing malfunction of the reactance keying operation.

Accordingly, it is highly desirable that a technique and an apparatus be developed for turning off such switches, as typically exemplified in SCR circuits, for preventing damage to the SCRs and the associated circuits when it is attempted to turn the SCRs off and also to realize the highest practical degree of efficiency in availing of the current carrying capacity of such SCRs to reduce cost of the equipment.

SUMMARY OF THE INVENTION

Prior art and present practices employed in the control of SCRs used for the purpose of switching conductive loads in association with VLF transmitters customarily rely upon self-commutation of the SCRs from a conductive to a non-conductive state upon the removal of a forward bias or the application of back bias. It has been found that serious transient current problems arise out of the methods presently employed in prior art equipments to cut off current conduction in SCRs. Moreover, these transient current problems are present even if the bias change to cause the SCR to become non-conductive is initiated in synchronism with the zero current crossover point.

It has been found that, despite synchronism of the bias change with the zero current crossover point, serious transient currents are developed because the SCR takes a finite period to shut down after the current has passed through its zero crossover point and has started to rise again. This is so because the SCR is trying to achieve its non-conductive state during a period when a large reactive current is rapidly rising.

A very important factor which vastly increases the magnitude of the rising current transient is inductance. Extremely small values of inductance can easily increase the transient magnitude above levels which the SCR can tolerate. It should be borne in mind that at VLF the SCR is operated with an inductive load of decidedly high inductance and high "Q". This factor can increase the transient by almost two orders of magnitude higher than levels which would be conventionally calculated. Additionally, in a typical VLF communication system, the magnitude of the transient produced may readily be over an order of magnitude higher than the best SCRs presently available will tolerate.

These transients are also large enough and fast enough to be conducted along other conductors in the circuit. In typical systems such transients have been measured at over 1500 amps per microsecond and include strong frequency components up to and including portions of the UHF band. As a result, these transients can be conducted to points in a system that would conventionally be considered electrically remote to the lower frequencies in the VLF range. Moreover, the transient energy which reaches these customarily remote points can be strong enough to turn on other SCRs such as, for example, SCRs used to control other reactance keying links or bias voltages, even when the largest possible di/dt snubbers in the form of high frequency paths to ground are used.

Because of the above described difficulties with unwanted transient effects, many prior art and present VLF reactance keying systems have customarily employed SCRs in a manner where the full current carrying capacities of the SCRs are not realized. This was necessary in the prior art techniques and methods of controlling the SCRs, because if a certain amplitude of current was exceeded the resultant transient would simply turn the SCRs on and keep them on so that the system would malfunction with potentially serious damage to the SCRs and other portions of the system.

In actual prior art systems, SCRs having a rated current carrying capacity of 25 KVA were operated at 10 to 12 KVA level so that in turning them off the transients developed would not turn the SCRs on and keep them on. Accordingly, the SCRs were operating at approximately one-half of their rated current capacity and, as a necessary consequence, twice the number of SCRs were required in any given installation. Moreover, the 50% rated current capacity level of operation in the prior art was found to be the best case in VLF systems rather than the average case, because the 50% of rated current capacity was realized at frequencies below 20 Kz; whereas, if the SCRs were operated at frequencies above 20Khz, the transient problem was aggravated, with the result that the SCRs might have to be operated at a significantly lesser percentage of rated current carrying capacity because of the drastically increased di/dt.

The present invention conceives a method and means for a significantly improved reactance keyed system wherein the switch means which controls current flow through a reactive element is initiated to its non-conductive state before the zero current crossover point in the reactive element, and when the current therethrough is decreasing in amplitude to minimize the transient signal load on the switch.

The concept of the present invention may be advantageously practiced in a communication system having a reactance keyed antenna which transmits information by radiating signals of at least two frequencies. A reactive element, operatively connected for determining the resonance of the antenna at a first frequency when there is current flow through the reactive element, is operative to change the resonance of the antenna to a second frequency when there is no current flow through the reactive element. Means for developing a sample of the signal being fed to the antenna is connected to a zero current crossover detector for generating an output signal in response to the zero current crossover point of the sample signal. An appropriate switch means, such as an arrangement of SCRs is connected across the reactive element for controlling current flow through the reactive element.

When the switch means is conductive, the reactive element is in operation and, when the switch is not conductive, current does not flow through the reactive element. These two alternatives of operation determine whether the antenna is resonant to either the first frequency or the second frequency, respectively. An enabling means is connected to actuate the switch to its non-conducting condition, the enabling means being responsive to the concurrence of a frequency shift command signal for changing the transmitted frequency from the first frequency to the second frequency, together with the output signal of the zero current crossover detector. Thus, upon the concurrence of these two signals, the enabling means actuates the switch means to its non-conducting condition causing a change in the resonance of the antenna from the first frequency to the second frequency.

Means for selectively varying the zero current crossover point of the sample signal relative to time, such as an appropriate variable delay means in the form of a phase shifter, is employed for varying the time disposition of the output signal of the zero current crossover detector so that the actuation of the switch means may be controllably determined. In accordance with the concept of the present invention, the time of actuation is adjusted to occur when the signal at the first frequency is decreasing in amplitude and also at a point in time sufficiently before its zero crossover to minimize the resultant transient signal load on the switch means. As a result, the undesirable effects from high current transients are obviated and the full current carrying capacity of the controlling SCRs used in such VLF systems may be realized.

In a typical VLF system design using a one megawatt transmitting station, the realization of the full current carrying capacity of the SCRs employed for controlling reactance keying resulted in a requirement for a commensurately smaller number of SCRs and elimination of more than one-half of the associated circuitry, thereby affecting a total saving of approximately 1 million dollars.

Accordingly, it is a primary object of the present invention to provide a method and means for changing the resonance of an antenna from a first frequency to a second frequency by reactance keying without the attendant disadvantages of prior art systems.

Another most important object of the present invention is to minimize the undesirable transient effects of switch means employed to control current flow through a reactive element used to control the resonant frequency of such antenna.

Yet another most important object of the present invention is to use substantially the full current carrying capacity of SCRs used in such switch means.

Yet a further most important object of the present invention is to control the initiation of changing the switch means from its conductive to its non-conductive state at a point in time where the signal is decreasing in amplitude and sufficiently before its zero crossover point to minimize the transient signal load on the switch.

Still another object of the present invention is to prevent the generation of unwanted transient signals having signal components of sufficient amplitude within a frequency range which may cause unwanted results in other portions of the associated circuit.

A still further, yet fundamentally basic object of the present invention, is to provide a method and system for rendering such a switch non-conductive with minimum malfunction and damage to other elements of the circuit due to unwanted transient currents.

These and other features, objects, and advantages of the present invention will be better appreciated from an understanding of the operative principles of a preferred embodiment as described hereinafter and as illustrated in the accompanying drawings.

The present invention conceives a method and a system for minimizing undesirable transients developed in a switch employed for reactively keying the resonant frequency of an antenna. In VLF communication systems the actual antenna normally has a large capacitive input impedance. Such an antenna is timed with a commensurately large inductive reactances to make the antenna system resonant at a predetermined and desired frequency. However, in such communication systems two or more frequencies may be used and therefore the antenna should be rendered resonant to each such frequency. One desirable method of achieving such change in resonance is to change the inductive value in the antenna circuit. This may be achieved by reactance keying i.e., the change in value of an inductance which is connected or coupled to the antenna itself.

Figure 1:
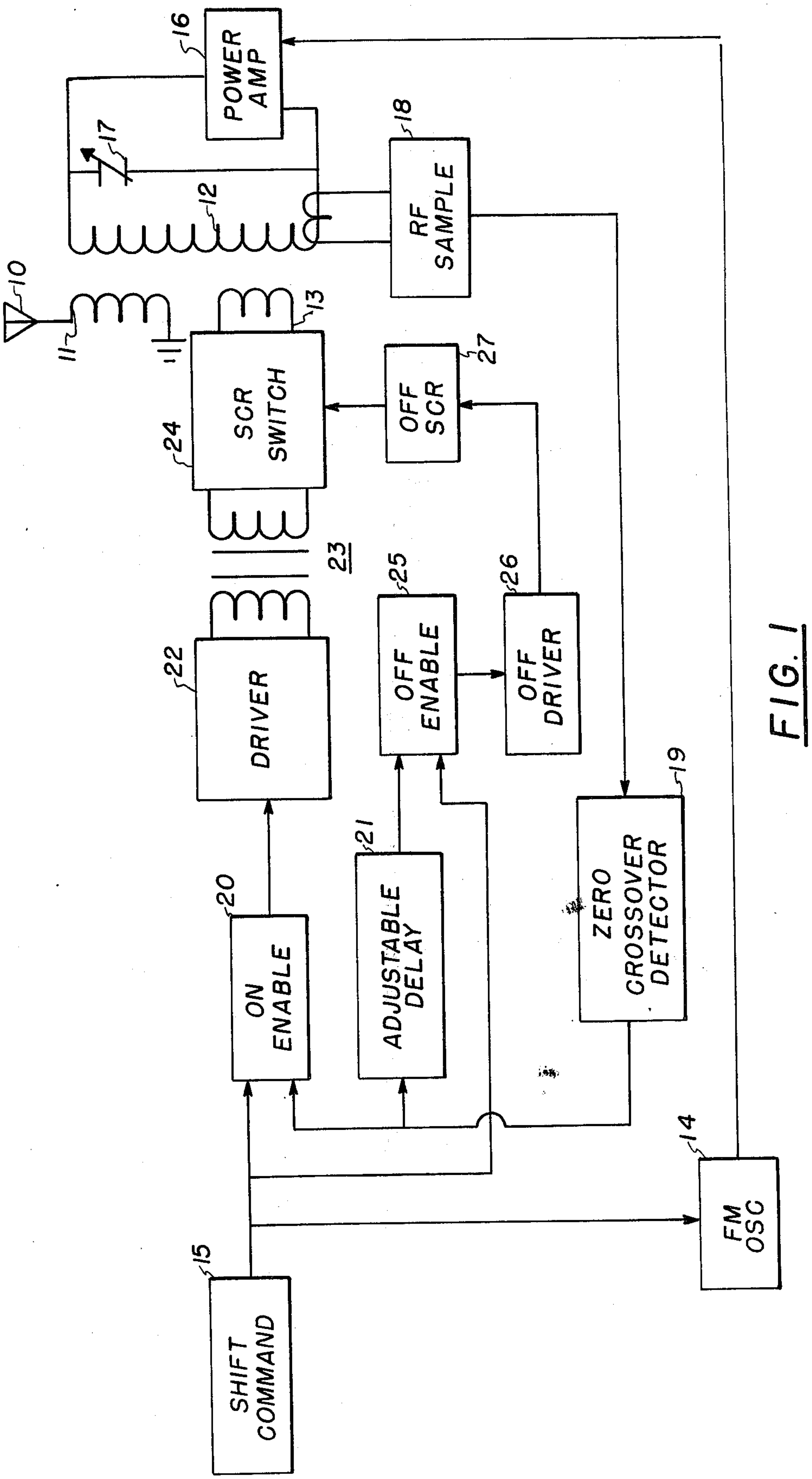
FIG. 1 is a schematic block diagram of a typical embodiment of the present invention.

FIG. 1 represents one such system. An antenna 10 is connected to an inductive element 11 and the inductive element 11 is in turn coupled to an inductor coil 12 which develops signals of the instantaneous frequencies it is desired to transmit. The coil 12, because of its coupling with the inductive element 11, represents part of the total inductance connected to the antenna 10. Accordingly, any change in the inductive value of the coil 12 will cause a commensurate change in the reactive value of the inductive element 11. Such a change may be affected by current flow through the inductive reactance 13 which is coupled to the inductive element 12. When current flow through the inductive reactance 13 ceases, there is a consequent change in the value of the inductive reactance of coil 12, resulting in a change in the inductive value of the inductive element 11 and a consequent change in the resonant frequency of the antenna 10.

In the arrangement illustrated in FIG. 1, an FM oscillator 14 is operative to produce desired instantaneous frequency signal output under the control of a frequency shift command unit 15. The output of the FM oscillator 14 is connected to a transmitter power amplifier 16 and the amplified output of the power amplifier 16 is connected to the inductor coil 12. A variable capacitance 17 is connected in parallel with both the power amplifier 16 and the inductive reactance 12 for tuning purposes. Inductor coil 12 is also coupled to a pick-off coil which develops a sample of its signal. The sample signal is connected as the input to a RF sample amplifier 18 which, in turn, provides the signal input to a zero current crossover detector 19.

The zero crossover detector 19 provides an output signal which is connected to both an ON enable circuit 20, and an adjustable delay element which may take the form of a phase shifter 21. The output signal of the ON enable circuit 20 is connected to a driver circuit 22 which provides the input to a transformer 23 having a secondary winding connected to the switch means 24. The output of the adjustable delay means 21 is connected to an OFF enable circuit 25 which receives a second input from the shift command unit 15. The output of the OFF enable circuit 25 is connected to an OFF drive means 26 which produces an output connected to an OFF control switch 27. The OFF control switch 27, in turn, produces an output which is utilized to control the operation of the switch 24.

OPERATION

In actual operation, the system of FIG. 1 would generate a frequency shift command signal through the shift command unit 15, requiring that a first frequency be developed and transmitted. This shift command signal from 15, when received by the FM oscillator 14, causes the FM oscillator 14 to generate an output signal of the first frequency. That frequency is amplified by the transmitter power amplifier 16 and is developed across the inductor coil 12 and is in turn coupled to the antenna 10 through the inductive element 11. As a result, the antenna 10 thus is enabled to transmit the first frequency.

In order to develop the first frequency at the antenna 10, the inductive reactance 13 is controlled to affect the resonance of the antenna 10 at the first frequency. This is accomplished by effectively short circuiting the inductive element 13 by causing the switch 24 connected across the element 13 to be in its conductive state. Switch 24 may comprise two oppositely polarized SCRs connected across the element 13, arranged to operate in response to appropriate bias signals for controlling their conduction.

A shift command signal for developing the first frequency is received in ON enable circuit 20 and, upon the ON enable circuit 20 receiving a second signal from the output of zero current crossover detector 19, an enabling output is developed, actuating the driver 22 through the magnetic coupling of transformer 23 to turn switch 24 on to its fully conductive condition.

However, when it is desired to transmit the second frequency, an appropriate frequency shift command signal is developed by the shift command unit 15. The frequency shift command signal is fed to the FM oscillator 14 so that it is caused to generate the second frequency rather than the first frequency. The second frequency is connected through the transmitter power amplifier 16 to the inductor coil 12 which is coupled to the antenna inductive element 11 and radiated from the antenna 10.

The switch 24, however, must be rendered non-conductive in order that the antenna resonance be changed to the second frequency. The shift command signal is received as one of the inputs to the OFF enable circuit 25 and a second signal produced from the adjustable delay circuit 21 provides the second input to the OFF enable circuit 25 causing it to produce an output which is connected into the OFF drive circuit 26. The OFF drive circuit 26 actuates the OFF control SCR circuit 27 which, in turn, controls the state of the switch means 24, rendering it non-conductive so the inductive reactance 13 is no longer short circuited, producing the desired effect on the inductive loading of antenna 10 causing it to be resonant to the second frequency.

It is important, however, to appreciate that initiation of the change of switch 24 to its non-conductive state is critical in the sense that such initiation must occur at a point of time which will avoid undesirable transient effects and minimize transient loading on the switch means. In accordance with the concept of the present invention, an RF sample signal is developed by the pick-off coil of sample signal circuit 18; then the zero current crossover point of the sample signal is determined in the detector 19, and the phase of the zero crossover point is adjusted so that the OFF enable circuit 25 is enabled by the reception of its second signal at a point in time when the current through the switch means 24 is decreasing and approaching the zero current crossover point, but is sufficiently before that zero current crossover point for minimizing the transient signal load on the switch means.

Figure 2:
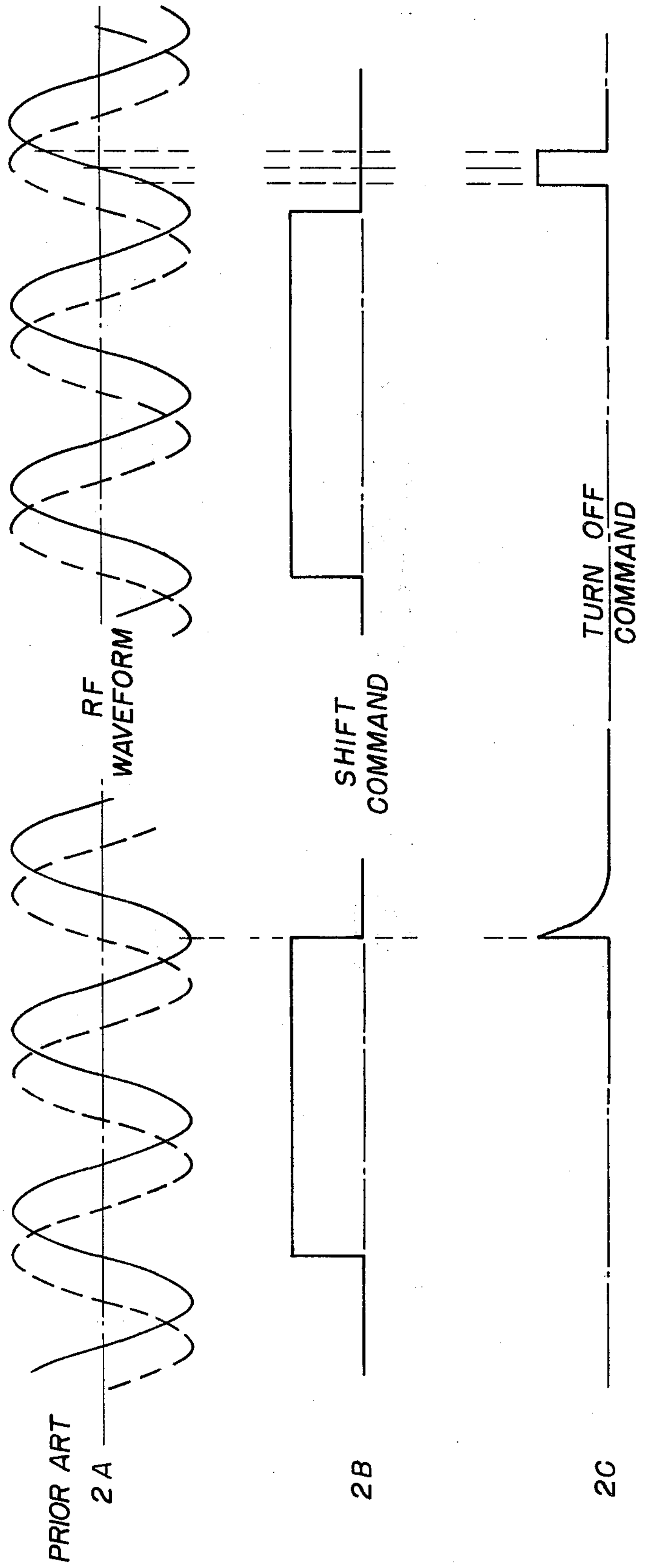
FIG. 2 is a graphical illustration of the waveforms of signals developed in a typical embodiment of the present invention.

The special timed relationship which is most important and inherent in the concept of the method and technique of the present invention is illustrated in FIG. 2. The relative time disposition of several waveforms as developed in typical operation of prior art systems are contrasted with waveforms developed in the operation of the system of FIG. 1 embodying the present invention. In the prior art arrangement shown on the left, waveforms 2A represent current and voltage developed across the switch 24 during its conduction. Waveform 2B represents the shift command signal which, in the prior art operation shown on the left, coincides with a relatively high amplitude of current. Waveform C of the prior art arrangement represents the turn-off signal which is generated substantially coincident in time with the trailing edge of the frequency shift command signal. It is this latter turn-off signal which is impressed upon the switch means, usually in the form of a suitable arrangement of SCRs which results in the development of the undesirable transient condition, a possible malfunction and damage to the circuitry as previously described.

By contrast, the waveforms on the right-hand side of FIG. 2 represent the time relationship of signals developed as conceived by the present invention. It will be noted that the frequency shift command occurs at substantially the same points in time relative to the RF waveform as was the case in the prior art system. However, an appropriate delay or phase shift is introduced into the circuitry employed to develop the turn-off signal so that the signal initiates the turn-off of the switch at a point where the amplitude of RF signal is decreasing and sufficiently before the zero current crossover point to minimize the transient signal load across a switch. It is this proper adjustment of synchronization of the initiation of the OFF command for rendering the switch non-conductive that makes possible substantially the full realization of the current carrying capacity of the switch means usually in the form of oppositely polarized SCRs which can result in reduction of as much as, or more than, one-half of the associated circuitry with a very significant and substantial cost reduction of typical transmitter installations in VLF communication systems.

It will be readily appreciated, of course, by those skilled and knowledgable in the art that as the current carrying capabilities of SCRs becomes improved with advancements in the art, yet further savings in the cost of such equipments will be made possible through the employment of the concept of the present invention. This cost advantage is, of course, in addition to the fact that the present invention is conceived to prevent overloading and damage to the switch means and consequent damage to the remainder of the system as well as its being rendered inoperative to perform its designed function of communicating information when such malfunction should occur.

In addition, the practice of the present invention minimizes transient currents which may include high frequency components which, if not suppressed in amplitude, could inadvertantly actuate elements of the system with resultant undesirable and unwanted effects.

Obviously many modifications and variations of the present invention are possible in the light of the above teachings. It is therefore to be understood that within the scope of the appended claims the invention may be practiced otherwise than specifically described.

What is claimed is:

1. In a communication system having a reactance keyed antenna transmitting information by radiating signals of at least two frequencies:

a reactive element operatively connected for changing the resonance of said antenna from a first frequency when there is current flow through said reactive element, to a second frequency when there is no current flow through said reactive element;

means for developing a sample of the signal being fed to said antenna for transmission;

a zero current crossover detector for receiving said sample and generating an output signal responsive to the sample signal zero current crossover point detected;

switch means connected across said reactive element for controlling current flow therethrough;

an enabling means responsive to a frequency shift command signal for changing the resonant frequency of said antenna from said first frequency to said second frequency upon the concurrence of said command signal with the output signal of said zero current crossover detector for actuating said switch means to its nonconducting condition; and means for selectively varying the zero current crossover point of said sample relative to time for causing the actuation of said switch means when the signal at said first frequency is decreasing in amplitude and at a point in time sufficiently before its zero crossover for minimizing transient signal load on said switch means.

2. A combination as claimed in claim 1 wherein said switch means comprises a SCR circuit.

3. A combination as claimed in claim 1 wherein said means for selectively varying the zero current crossover point of said sample signal relative to time comprises a variable delay means.

4. A combination as claimed in claim 1 wherein said means for selectively varying the zero current crossover point of said sample signal relative to time comprises a variable phase shifter.

5. A combination as claimed in claim 1 wherein said switch means comprises at least two SCRs connected in opposite polarization across a reactance operatively responsive to change the resonant frequency of said antenna.

6. A combination as claimed in claim 5 wherein said reactance comprises an inductor coupled with the antenna circuit.

7. A combination as claimed in claim 6 wherein said inductor is coupled with an antenna tuning inductance.

* * * * *